(12) United States Patent
Schall et al.

(10) Patent No.: US 10,645,761 B2
(45) Date of Patent: May 5, 2020

(54) TRANSPARENT PANE WITH HEATED COATING

(71) Applicant: SAINT-GOBAIN GLASS FRANCE, Courbevoie (FR)

(72) Inventors: Guenther Schall, Kreuzau (DE); Bernhard Reul, Herzogenrath (DE); Dang Cuong Phan, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 451 days.

(21) Appl. No.: 15/506,224

(22) PCT Filed: Aug. 19, 2015

(86) PCT No.: PCT/EP2015/069002
§ 371 (c)(1),
(2) Date: Feb. 23, 2017

(87) PCT Pub. No.: WO2016/034414
PCT Pub. Date: Mar. 10, 2016

(65) Prior Publication Data
US 2017/0251527 A1    Aug. 31, 2017

(30) Foreign Application Priority Data
Sep. 4, 2014 (EP) .................................. 14183519

(51) Int. Cl.
*H05B 3/86* (2006.01)
*H05B 3/12* (2006.01)
*H05B 3/84* (2006.01)

(52) U.S. Cl.
CPC ................. *H05B 3/86* (2013.01); *H05B 3/12* (2013.01); *H05B 3/84* (2013.01);
(Continued)

(58) Field of Classification Search
CPC ... H05B 3/86; H05B 3/12; H05B 3/84; H05B 3/06; H05B 2203/004; H05B 2203/008;
(Continued)

(56) References Cited

U.S. PATENT DOCUMENTS 3,409,759 A    11/1968  Boicey et al.
4,057,671 A *  11/1977  Shoop .............. B32B 17/10018
                                                   428/208

(Continued)

FOREIGN PATENT DOCUMENTS

CN    102474912 A    5/2012
DE    3644297 A1     7/1987
(Continued)

OTHER PUBLICATIONS

International Search Report for PCT/EP2015/069002 filed Aug. 19, 2015 on behalf of Saint-Gobain Glass France, dated Oct. 7, 2015. 7 pages (German original + English translation).
(Continued)

*Primary Examiner* — Shawntina T Fuqua
(74) *Attorney, Agent, or Firm* — Pillsbury Winthrop Shaw Pittman LLP (57) ABSTRACT

A transparent pane having at least one heatable, electrically conductive coating is presented. Application of a supply voltage causes a heating current to flow over a heating field. The heating field contains at least one coating-free zone.

16 Claims, 5 Drawing Sheets

(52) U.S. Cl.
CPC .. *H05B 2203/004* (2013.01); *H05B 2203/008* (2013.01); *H05B 2203/011* (2013.01); *H05B 2203/013* (2013.01); *H05B 2203/017* (2013.01)

(58) Field of Classification Search
CPC ........ H05B 2203/011; H05B 2203/013; H05B 2203/017; H05B 2203/016; H05B 2203/005; H05B 1/0236; B23K 26/351; B23K 2101/36; B32B 17/10807; B32B 17/10192; B32B 17/10036; B32B 2605/006; B32B 2315/08; B32B 2307/202; H03K 17/962
See application file for complete search history.

(56) References Cited

U.S. PATENT DOCUMENTS

| | | | |
|---|---|---|---|
| 5,414,240 | A | 5/1995 | Carter et al. |
| 6,670,581 | B1* | 12/2003 | Degand ............. B32B 17/10036 219/203 |
| 2002/0045037 | A1 | 4/2002 | Boire et al. |
| 2004/0065651 | A1 | 4/2004 | Voeltzel |
| 2007/0020465 | A1 | 1/2007 | Thiel et al. |
| 2011/0108537 | A1* | 5/2011 | Schall ............... B32B 17/10036 219/201 |
| 2013/0082043 | A1 | 4/2013 | McCarthy |

FOREIGN PATENT DOCUMENTS

| | | |
|---|---|---|
| DE | 4316575 C1 | 7/1994 |
| DE | 102008018147 A1 | 10/2009 |
| DE | 102008029986 A1 | 1/2010 |
| DE | 202008017611 U1 | 4/2010 |
| EP | 0788294 A2 | 1/1997 |
| EP | 0847965 B1 | 10/2004 |
| EP | 2200097 A1 | 12/2008 |
| EP | 2139049 A1 | 12/2009 |
| EP | 2334141 A1 | 6/2011 |
| GB | 2381179 A | 4/2003 |
| KR | 10-2013-0096275 A | 8/2013 |
| WO | 00/72635 A1 | 11/2000 |
| WO | 2011006743 A1 | 1/2011 |
| WO | 2012031907 A1 | 3/2012 |
| WO | 2012031908 A1 | 3/2012 |
| WO | 2012052315 A1 | 4/2012 |
| WO | 2014/095153 A1 | 6/2014 |
| WO | WO 2014/095152 A1 | 6/2014 |

OTHER PUBLICATIONS

International Search Report for PCT/EP2015/069001 filed Aug. 19, 2015 on behalf of Saint-Gobain Glass France, dated Oct. 5, 2015. 7 pages (German original + English translation).

* cited by examiner

TRANSPARENT PANE WITH HEATED COATING

The invention relates generically to a heatable transparent pane with an electrically heatable coating according to the generic portion of Claim 1.

Moreover, the invention relates to a method for producing a heatable transparent pane.

And, not least, the invention relates to the use of a heatable transparent pane.

The content of the prior art documents listed below is, in full, an integral part of the present application.

Heatable transparent panes with an electrical heating layer are known per se and have already been described frequently in the patent literature. Merely by way of example, reference is made in this connection to the German published patent applications DE 102008018147 A1, DE 102008029986 A1, and WO 00/72635 A1. In motor vehicles, they are often used as windshields since, by law, the central field of vision must not have any limitations to vision, with the exception of heating wires. Condensed moisture, ice, and snow can be removed in a short time by the heat generated by the heating layer. Most commonly, such panes are produced as composite panes in which two individual panes are bonded to one another by a thermoplastic adhesive layer. The heating layer can be applied to one of the inner surfaces of the individual panes, but with structures also known in which it is situated on a carrier that is arranged between the two individual panes.

The heating layer is usually electrically connected to at least one pair of strip- or band-shaped collection lines ("busbars"), which are intended to introduce the heating current as uniformly as possible into the coating and to distribute it broadly. For an attractive aesthetic appearance of the pane, the nontransparent collection lines are concealed by opaque masking strips.

Generally speaking, the specific heating power $P_{spec}$ of a heatable coating can be described by the formula $P_{spec} = U^2/(R_\square \cdot D^2)$, where U is the supply voltage, $R_\square$ is the electrical sheet resistance of the coating, and D is the distance between the two collection lines. The sheet resistance $R_\square$ of the coating is, with the materials currently used in industrial series production, on the magnitude of a few ohms per unit of area ($\Omega/\square$).

In order to obtain a satisfactory heating power for the desired purpose with the onboard voltage of 12 to 24 V standardly available in motor vehicles, the collection lines should have the least possible distance D from one another. Given that the resistance R of the heatable coating increases with the length of the current path and since motor vehicle window panes are usually wider than they are high, the collection lines are normally arranged along the upper and lower pane edges such that the heating current can flow over the shorter path of the height of the pane.

But, panes with an electrical heating layer block electromagnetic radiation relatively severely such that, in particular, in motor vehicles with a heatable windshield, radio data traffic can be significantly impaired. Heatable windshields are, consequently, frequently provided with coating-free zones ("communication or sensor windows") which are readily permeable at least to specific ranges of the electromagnetic spectrum in order to thus enable smooth data traffic. The coating-free zones, on which electronic devices, such as sensors and the like, are frequently situated, are usually arranged in the vicinity of the upper pane edges where they can be well concealed by the upper masking strip.

However, coating-free zones negatively impact the electrical properties, which affects, at least locally, the current density distribution of the heating current flowing through the heating layer. In fact, they cause highly inhomogeneous heating power distribution, with the heating power below and in the surroundings of the coating-free zones being significantly reduced. On the other hand, locations with particularly high current density (hot spots) occur where the heating power is greatly increased. As a result, very high local pane temperatures can occur, which represent a risk of burns and impose great thermal stresses on the panes. In addition, adhesion points of attachment parts can be loosened thereby.

The experts have attempted to remedy these problems through the shaping of the heating field and/or of the collection lines and/or through the incorporation of a third collection line.

Thus, for example, from the British patent application GB 2381179 A, a heatable windshield is known, whose heating layer is divided into at least two fields or zones that are separated from one another by by uncoated regions. The coating-free communication window is situated in the central zone of the coating. The upper collection line in the installed state is routed around three edges (horizontal lower edge and two vertical side edges running parallel to one another) of the communication window. The subsections of the collection line running along the two side edges are routed through the two uncoated regions that separate the central zone from the two zones positioned laterally thereto.

Known from the international patent application WO 2011/006743 A1 is a heatable windshield which has, on a transparent substrate, an electrically conductive coating, two electrical collection bands, at least one locally delimited region defined by the coating, and, within this region, a coating-free region as a communication window. The defined region is at least partially delimited by at least two current collecting regions on the coating that run parallel to equipotential lines and are connected via at least one ohmic resistor and at least two electrically isolating separation lines that run parallel to electrical field lines.

Also known from the European patent application EP 2 334 141 A1 is a coated pane with a heatable communication window. In the coating-free region of the communication window, at least one heating conductor with two poles is mounted in the coating-free region of the communication window, with the first pole electrically connected to the electrically conductive transparent coating and the second pole electrically connected to said coating or to a current collection band.

Also known from the international patent applications WO 2012/031907 A1 and WO 2012/031908 A1 is a transparent pane with an electrically heatable coating, which is electrically connected to at least two first electrodes provided for the electrical connections to the two poles of a voltage source such that by application of a supply voltage, a heating current flows over a heating field formed between the two first electrodes. Here, the heating field has at least one coating-free zone as a communication window that is delimited by a zone edge formed, at least in sections, by the heatable coating. The pane further has a second electrode that is provided for connecting to one pole of the voltage source. The second electrode has at least one supply line section arranged at least in sections of the coating-free zone and one or a plurality of connection sections connected to the supply line section. Here, the connection sections extend in each case starting from the coating-free zone across an edge section of the zone edge. The edge section is formed by a section of the heating field that is situated between the coating-free zone and the first electrode provided for connection to the other pole of the voltage source.

In one embodiment, the supply line section consists of at least two supply line parts separated from one another, which have, in each case, a coupling adapter that is electrically connected to the heatable coating. The two coupling sections are arranged such that they are galvanically coupled by the heatable coating.

Furthermore, known from the European patent Patent EP 1 183 912 B1 is a transparent, heatable pane, which has, in addition to the upper and the lower collection line, a third collection line or busbar that has an electrical resistance <0.35 ohm per square ($\Omega/\square$) in at least one region of the perimeter of the communication window.

And, not least, known from the international patent application WO 2010/136400 is a transparent, heatable pane that comprises at least one transparent, electrically isolating substrate, at least one large area, electrically conductive, transparent coating that is connected to two electrical collection rails or collection conductors for transmitting electrical power, and at least one communication window as well as a third collection line or busbar.

These known configurations of heatable panes have already brought about considerable progress. However, the known configurations cannot satisfactorily solve the above-described problems of local overheating in heatable panes that have a particularly large communication window and/or a design of the black edge coating or masking that is particularly demanding from a geometric standpoint.

However, the number of cameras, sensors, and antennas behind the windshield of automobiles is constantly increasing. For many of these devices, the transparent, electrically conductive coating must be removed locally. These communication windows are thus becoming steadily larger and their edges can no longer be totally covered by the black masking that is applied either in solid printing and/or as a dot grid. As a result, the third collection conductor for the third busbar becomes at least partially visible from the inside and from the outside. Thus, additional requirements besides the electrical requirements are imposed on the third collection conductor, in particular with regard to color. Here, for the most part, for the busbars, dark colors are preferred by OEM (Original Equipment Manufacturing). In contrast, bright, silver-colored aspects are less preferred. However, a dark color is associated with a reduction of the silver content in the paste and, thus, a reduction in electrical conductivity such that the dark silver pastes are not suitable for the upper or lower collection conductor.

In contrast, the object of the present invention consists in improving the known generic panes such that the transparent panes are heatable across their entire heating layer with at least approx. uniform heating power distribution and no longer have hot spots due to new particularly demanding geometric designs of the black edge coating and/or caused by particularly large communication windows. Moreover, the transparent panes that have at least partially visible communication windows and third collection lines not concealed by the masking should allow the use of dark silver pastes.

These and other objects are accomplished according to the proposal of the invention by a transparent pane with the characteristics of the independent claim. Advantageous embodiments of the invention are indicated through the characteristics of the subclaims.

In an advantageous embodiment of the pane according to the invention, the surface of the first pane, on which the electrically heatable coating is arranged, is areally bonded to a second pane via a thermoplastic intermediate layer.

All electrically insulating substrates that are thermally and chemically stable as well as dimensionally stable under the conditions of the production and use of the pane according to the invention are, in principle, suitable as the first and, optionally, the second pane.

The first pane and/or the second pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethylmethacrylate, polystyrene, polyamide, polyester, polyvinylchloride, and/or mixtures thereof. The first pane and/or the second pane are preferably transparent, in particular for the use of the pane as a windshield or rear window of a motor vehicle or other uses in which high light transmittance is desired. In the context of the invention, a pane that has transmittance in the visible spectral range >70% is understood to be "transparent". For panes that are not in the traffic-relevant field of vision of the driver, for example, for roof panels, the transmittance can, however, also be much less, for example, >5%.

The thickness of the pane according to the invention can vary widely and thus be eminently adapted to the requirements of the individual case. Preferably, panes are used with the standard thicknesses of 1.0 mm to 25 mm, more preferably of 1.4 mm to 2.5 mm for motor vehicle glass and preferably of 4 mm to 25 mm for furniture, appliances, and buildings, in particular for electric heaters. The size of the pane can vary widely and is governed by the size of the use according to the invention. The first pane and, optionally, the second pane have, for example, in the motor vehicle industry and the architectural sector, usual areas from 200 $cm^2$ all the way to 20 $m^2$.

The pane according to the invention can have any three-dimensional shape. Preferably, the three-dimensional shape has no shadow zones such that it can, for example, be coated by cathodic sputtering. Preferably, the substrates are planar or slightly or greatly bent in one or a plurality of spatial directions. In particular, planar substrates are used. The panes can be colorless or colored.

Multiple panes are bonded to one another by at least one intermediate layer. The intermediate layer preferably contains at least one thermoplastic plastic, preferably polyvinyl butyral (PVB), ethylene vinyl acetate (EVA), and/or polyethylene terephthalate (PET). The thermoplastic intermediate layer can, however, for example, also contain polyurethane (PU), polypropylene (PP), polyacrylate, polyethylene (PE), polycarbonate (PC), polymethylmethacrylate, polyvinylchloride, polyacetate resins, casting resins, fluorinated ethylene-propylene copolymers, polyvinyl fluoride, and/or ethylene-tetrafluoroethylene copolymers, or copolymers or mixtures thereof. The thermoplastic intermediate layer can be formed by one or even a plurality of thermoplastic films arranged one over another, with the thickness of a thermoplastic film preferably being from 0.25 mm to 1 mm, typically 0.38 mm or 0.76 mm.

In a composite pane according to the invention comprising a first pane, an intermediate layer, and a second pane, the electrically heatable coating can be applied directly on the first pane or on a carrier film or on the intermediate layer itself. The first pane and the second pane have, in each case, an inside surface and an outside surface. The inside surfaces of the first and of the second pane are turned toward one another and bonded to one another by the thermoplastic intermediate layer. The outside surfaces of the first and of the second pane are turned away from one another and from the thermoplastic intermediate layer. The electrically conductive coating is applied on the inside surface of the first pane. Of course, another electrically conductive coating can also be applied on the inside surface of the second pane. The outside surfaces of the panes can also have coatings. The terms "first pane" and "second pane" are selected for differentiation of the two panes in a composite pane according to the invention. No statement as to geometric arrangement is associated with the terms. If the pane according to the invention is provided, for example, in an opening, for example, of a motor vehicle or a building for the purpose of separating the interior from the outside environment, the first pane can be turned toward the interior or the outside environment.

The transparent pane according to the invention comprises an electrically conductive, heatable, transparent coating that extends over at least a substantial part of the pane, in particular over its field of vision. The electrically conductive coating is electrically connected to at least two, in particular, two, collection lines provided for the electrical connection to the two poles of a voltage source such that by application of a supply voltage, a heating current flows over a heating field formed between the two collection lines. Typically, the two collection lines are implemented in each case in the form of a strip- or band-shaped electrode or collection rail or busbar for the introduction and broad distribution of the current in the conductive coating. For this purpose, they are galvanically connected to the heating layer.

At least one, in particular, one, of the two collection lines, preferably the upper collection line in the installed state of the transparent pane can be subdivided into at least two, in particular, two, subregions separated from one another. It is, however, preferred according to the invention for the two collection lines to be implemented continuously, i.e., not divided into two subregions separated from one another.

In an advantageous embodiment, the collection line is implemented as a conductive structure printed by screen-printing and fired thereafter. The printed-on collection line preferably contains at least a metal, a metal alloy, a metal compound, and/or carbon, particularly preferably a noble metal and, in particular, silver. The printing paste for producing the collection line preferably contains metal particles and/or carbon and, in particular, noble metal particles such as silver particles. The electrical conductivity is preferably achieved by means of the electrically conducting particles. The particles can be situated in an organic and/or inorganic matrix such as pastes or inks, preferably as printing paste with the glass frits.

The layer thickness of the printed-on collection line is preferably from 5 µm to 40 µm, particularly preferably from 8 µm to 20 µm, and most particularly preferably from 8 µm to 12 µm. Printed-on collection lines with these thicknesses are technically simple to realize and have advantageous current carrying capacity.

The specific resistance $\rho_a$ of the collection lines is preferably from 0.8 µohm·cm to 7.0 µohm·cm and particularly preferably from 1.0 µohm·cm to 2.5 ρohm·cm. Collection lines with specific resistances in this range are technically simple to realize and have advantageous current carrying capacity.

Due to the electrical requirements, bright, silver-colored collection lines with high silver content are preferably used. For their production, a screenprinting paste with a high silver fraction is most particularly preferably used. In particular, the silver content is 70 to 90 wt.-%, preferably 75 to 85 wt.-%, based, in each case, on the total amount of the silver paste.

Alternatively, however, the collection line can also be implemented as a strip or, in the case of a collection line divided into subregions, as at least two, in particular, two, strips of an electrically conductive film. The collection line then contains, for example, at least aluminum, copper, tinned copper, gold, silver, zinc, tungsten, and/or tin or alloys thereof. The strip preferably has a thickness of 10 µm to 500 µm, particularly preferably of 30 µm to 300 µm. Collection lines made of electrically conductive films with these thicknesses are technically simple to realize and have advantageous current carrying capacity. The strip can be electrically conductively connected to the electrically conductive structure, for example, via a solder compound, via an electrically conductive adhesive, or by direct placement.

The electrically conductive coating of the pane according to the invention can be divided into a heating field, i.e., the heatable portion of the electrically conductive coating that is situated between the two collection lines such that a heating current can be introduced and a region outside said heating field.

Electrically heatable coatings are known, for example, from DE 20 2008 017 611 U1, EP 0 847 965 B1, or WO20121052315 A1. They typically contain a functional layer or a plurality, for example, two, three, or four electrically conductive, functional layers. The functional layers preferably contain at least one metal, for example, silver, gold, copper, nickel, and/or chromium, or a metal alloy. The functional layers particularly preferably contain at least 90 wt.-% of the metal, in particular at least 99.9 wt.-% of the metal. The functional layers can be made of the metal or the metal alloy. The functional layers particularly preferably contain silver or a silver-containing alloy. Such functional layers have particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained.

Typically, in each case, at least one dielectric layer is arranged between two adjacent functional layers of the electrically conductive coating. Preferably, another dielectric layer is arranged below the first and/or above the last functional layer. A dielectric layer contains at least one individual layer made of a dielectric material, for example, a nitride such as silicon nitride or an oxide such as aluminum oxide. However, the dielectric layer can also include a plurality of individual layers, for example, individual layers of a dielectric material, smoothing layers, matching layers, blocker layers, and/or antireflection layers. The thickness of a dielectric layer is, for example, from 10 nm to 200 nm.

This layer structure is generally obtained by a sequence of deposition procedures that are performed by a vacuum method such as magnetic field enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al).

The electrically conductive coating can, in principle, be any coating that is intended to be electrically contacted. If the pane according to the invention is intended to enable vision through it, as is, for example, the case with panes in the window sector, the electrically conductive coating is preferably transparent. The electrically conductive coating is preferably transparent to electromagnetic radiation, particularly preferably to electromagnetic radiation of a wavelength from 300 to 1300 nm and, in particular, to visible light.

In an advantageous embodiment, the electrically conductive coating is a layer or a layer structure of multiple individual layers with a total thickness less than or equal to 2 µm, particularly preferably less than or equal to 1 µm.

An advantageous electrically conductive coating has a sheet resistance of 0.4Ω/□ to 10Ω/□. In a particularly preferred embodiment, the electrically conductive coating according to the invention has a sheet resistance of 0.5Ω/□ to 1Ω/□. Coatings with such sheet resistances are particularly suitable for the heating of motor vehicle window panes with typical onboard voltages from 12 V to 48 volts or in electrical vehicles with typical onboard voltages of up to 500 V.

The electrically conductive coating can extend over the entire surface of the first pane. Alternatively, however, the electrically conductive coating can also extend only over a portion of the surface of the first pane. The electrically conductive coating preferably extends over at least 50%, particularly preferably over at least 70% and most particularly preferably over at least 90% of the inside surface of the first pane.

In an advantageous embodiment of a transparent pane according to the invention as a composite pane, the inside surface of the first pane has a peripheral edge region with a width of 2 mm to 50 mm, preferably of 5 mm to 20 mm, which is not provided with the electrically conductive coating. The electrically conductive coating then has no contact with the atmosphere with the atmosphere and is protected in the interior of the pane against damage and corrosion by the thermoplastic intermediate layer.

In the transparent pane according to the invention, the heating field includes at least one coating-free zone in which no electrically conductive coating is present. The coating-free zone is delimited by a zone edge formed, at least in sections, by the electrically conductive coating.

In particular, the coating-free zone has a peripheral zone edge that is formed completely by the electrically conductive coating.

However, the zone edge can transition into the peripheral coating edge of the electrically conductive coating such that the coating-free zone is connected directly to the coating-free edge strip of the transparent pane according to the invention surrounding the pane edges.

The coating-free zone can have extremely varied contours. Thus, the contour can be square, rectangular, trapezoidal, triangular, pentagonal, hexagonal, heptagonal, or octagonal, optionally, with rounded corners and/or curved edges as well as circular, oval, drop-shaped, or elliptical. The contour lines can have a rectilinear, wave-shaped, zigzag-shaped, and/or sawtooth-shaped course. Several of these geometric characteristic can be realized in one and the same coating-free zone.

In particular, the coating-free zone serves as a communication window that is permeable to electromagnetic radiation, in particular, IR radiation, radar radiation, and/or radio radiation. Moreover, sensors, for example, rain sensors, can also be placed in the communication window.

The coating-free zone can be produced, for example, by masking during application of the heating layer on a substrate for by removal of the heating layer, for example, by mechanical and/or chemical removal and/or by removal by irradiation with electromagnetic radiation, in particular, laser light irradiation, after the application of the electrically heatable coating.

In a preferred embodiment, at least one, in particular, one, second coating-free zone is present.

Preferably, this at least one second coating-free zone is arranged, in the installed state of the transparent pane according to the invention, above the at least one first coating-free zone.

Preferably, the at least one second coating-free zone has the above-described contours and contour lines.

Preferably, the at least one second coating-free zone has a smaller area than the at least one first coating-free zone.

Preferably, the at least one second coating-free zone is arranged, in the installed state of the transparent pane, in its upper region.

According to the proposal of the invention, the transparent pane according to the invention is substantially distinguished by the fact that it has at least one, in particular, one, additional electrode, third collection line, or third busbar provided for the electrical connection to one pole of the voltage source, which is arranged, at least in sections, in particular, with only one electrode section, in the coating-free zone or, preferably, in and/or on the heating field of the electrically heatable coating and is electrically connected to the electrically conductive coating such that upon application of a supply voltage, a portion of the heating current flows over a heating field section of the heating field that is situated between the additional electrode or the coating-free zone and the collection line provided for connection to the other pole of the voltage source.

Thus, the at least one additional electrode or third busbar is electrically connected to the collection lines via the heating field of the electrically conductive coating.

Preferably, the at least one additional electrode surrounds the at least one coating-free zone completely or in sections.

At least one of the additional electrodes or the one additional electrode can be subdivided into at least two, in particular, two, subregions separated from one another. However, according to the invention, it is preferable for the at least one additional electrode or the one additional electrode to be implemented continuously, i.e., not divided into subregions.

Preferably, the at least one additional electrode extends, or the at least two subregions of the additional electrode separated from one another extend, along the zone edge of the at least one coating-free zone. "Along" means that the additional electrode or its subregions separated from one another run nearly parallel or exactly parallel to the lower zone edge.

If the additional electrode or its at least two subregions separated from one another are arranged in the coating-free zone such that the area between the zone edge of the heating field and the additional electrode or its subregions is still coating-free, the electrical connection of the additional electrode to the heating field section is realized using at least two, preferably at least three, more preferably at least four, and, in particular, at least five connection sections. If the additional electrode is subdivided into at least two, in particular, two, subregions separated from one another, at least one subregion has or, in particular, all subregions have at least two, preferably at least three, preferably at least four, and, in particular, at least five connection sections.

The connection sections can have the shape of straight or curved strips whose length is greater than their width.

The connection sections can, however, also be formed by bulges and/or protrusions of the additional electrode or of its subregions, if this runs or these run, for example, wave-shaped, zigzag-shaped, sawtooth-shaped, or meander-shaped such that they touch the heating field in sections.

The connection sections extend from the additional electrode or its subregions separated from one another into the heating field section of the heating field between the additional electrode or its subregions and the oppositely electrically charged collection line, in particular the lower collection line in the installed state of the transparent pane according to the invention.

Preferably, the electrical connection of the additional electrode to the two poles of the voltage source is made via the heating field and via the two collection lines, in particular, via the upper and lower collection line in the installed state of the pane according to the invention.

More precisely, the electrical potential, in particular at the connection point to the heating field is, on the one hand, set by the length of the additional electrode or its subregions such that as much current as possible flows via the additional electrode or its subregions. On the other hand, only so much current is allowed to flow that the additional electrode or its subregions and their immediate surroundings do not overheat, in order to prevent the formation of hot spots. Thus, the electrical potential or the electrical resistance of the additional electrode can be appropriately adapted over its width.

Preferably, the additional electrode is 0.5 to 2 μm thick, preferably 0.5 to 1 μm, and 1 to 5 μm wide, preferably 1 to 3 μm. Its length is governed primarily by the size of the associated coating-free zone.

Overall, nearly homogeneous distribution of the heating power is effected by the arrangement of the collection line and the additional electrode according to the invention and the formation of locations with reduced or increased heating power (hotspots) is effectively prevented.

Since subregions of the additional electrode can also run in the region of the coating-free zone of the transparent pane according to the invention, the formation of residues of ice and/or condensed water in the immediate vicinity of the subregions can be reduced.

In a preferred embodiment of the pane according to the invention, the collection lines are produced using a bright silver paste that has a silver content of 70 to 90 wt.-%, in particular 75 to 85 wt.-%, based, in each case, on the total amount of the silver paste. Such bright silver pastes fully satisfy the electrical requirements established by the OEMs.

However, the additional electrode visible at least in sections from the inside and the outside must satisfy not only the electrical requirements established therefor, but also the color requirements established by the OEMs.

According to the invention, this is realized using a dark silver paste printed-on and subsequently fired, i.e., a silver paste with a relatively low silver content, in particular with a silver content that is significantly lower than the silver content of the silver paste for the collection lines.

Preferably, the silver content of the dark silver pastes is 50 to <70 wt.-%, in particular 60 to <70 wt.-%, based, in each case, on the total amount of the silver paste.

According to the invention, due to the different silver content, the electrical conductivity of the additional electrode is less than the electrical conductivity of the collection lines. Preferably, the electrical conductivity of the additional electrode is 0.05 to 0.3 times, in particular 0.1 to 0.2 times, the electrical conductivity of the collection lines.

The collection lines and/or their subregions are electrically contacted by one or a plurality of supply lines.

The supply line is preferably implemented as a flexible film conductor or flat conductor or flat-band conductor. This means an electrical conductor whose width is significantly greater than its thickness. Such a flat conductor is, for example, a strip or band, containing or made of copper, tinned copper, aluminum, silver, gold, or alloys thereof. The flat conductor has, for example, a width of 2 mm to 16 mm and a thickness of 0.03 mm to 0.1 mm. The flat conductor can have an insulating, preferably polymeric sheath, for example, based on polyimide. Flat conductors that are suitable for contacting electrically conductive coatings in panes have a total thickness of, for example, only 0.3 mm. Such thin flat conductors can be embedded without difficulty between the individual panes in the thermoplastic intermediate layer. A plurality of conductive layers electrically isolated from one another can be situated in a flat conductor band.

Alternatively, thin metal wires can also be used as an electrical supply line. The metal wires contain, in particular, copper, tungsten, gold, silver, or aluminum or alloys of at least two of these metals. The alloys can also contain molybdenum, rhenium, osmium, iridium, palladium, or platinum.

In a preferred embodiment of the transparent pane according to the invention, each of the at least two, in particular, two, collection lines is electrically conductively connected, in each case, with a flat conductor to the poles of the voltage source.

In another preferred embodiment, the at least two, in particular, two, subregions of the at least one, in particular, one, collection line are electrically conductively connected in each case to a flat conductor connected to a voltage source. Preferably, the flat conductors are arranged in the region of the subregions which is, in each case, near the associated second side of the pane edge.

In yet another preferred embodiment, the at least two, in particular, two, subregions of the at least one, in particular, one, collection line are electrically conductively connected to a flat conductor. Preferably, in this embodiment, the flat conductor is arranged centrally between the two ends of the subregions opposite one another. Preferably, this is effected by a common electrically conductive connection part or by two electrically conductive connection parts associated with the respective subregion. The flat conductor can be connected to the electrically conductive connection part through a flat metal strip, in particular, a copper strip.

In this case, the electrical isolation between the flat conductor and the connection part is effected by means of an electrically insulating layer, in particular by means of a strip-shaped, electrically insulating layer, between the flat conductor and the connection part. It can also abut the two end edges of the subregions opposite one another.

A substantial advantage of this arrangement is that only one additional flat conductor is necessary for supplying two subregions of a collection line, which significantly simplifies the production of the transparent pane according to the invention.

In the transparent pane according to the invention, the regions in which the collection lines and the flat conductor(s) is/are arranged is optically masked by conventional, known opaque or nontransparent masking strips. Preferably, the masking strips are colored black. Preferably, the precursors of the masking strips are applied by screenprinting on the as yet uncoated panes, after which the layers applied are fired.

Moreover, a subregion of the at least one first coating-free zone and the at least one additional electrode associated therewith is not covered by the masking strip but, instead, is visible from inside and outside.

The panes according to the invention can be produced in a conventional, known manner. Preferably, they are produced using the method according to the invention.

The method according to the invention comprises the following process steps:

(A) producing an electrically conductive coating
(B) producing at least one coating-free zone or at least two, coating-free zones in the electrically conductive coating and in the heating field;
(C) forming at least two, in particular, two, collection lines connected to the two poles of a voltage source, which are electrically connected to the electrically conductive coating such that by application of a supply voltage, a heating current flows over a heating field situated between the two collection lines, and/or
(D) producing at least one additional electrode provided for the electrical connection via the heating field to the at least two collection lines surrounding, at least in sections, the at least one coating-free zone, wherein
(E) the process steps (C) and (D) are preferably performed one after the other or simultaneously, in particular simultaneously, wherein the electrical conductivity of the collection lines is greater than the electrical conductivity of the additional electrodes.

In a particularly preferred embodiment of the method according to the invention, the process steps C and D are performed simultaneously. Preferably, a screenprinting method is used.

In a most particularly preferred embodiment of the method according to the invention, a bright silver paste with a silver content of 70 to 90 wt.-%, in particular 75 to 85 wt.-%, based, in each case, on the total amount of the bright silver paste, is used for the process step C.

In contrast, for the process step D, a dark silver paste with a silver content of 50 to <70 wt.-%, in particular 60 to <70 wt.-%, based, in each case, on the total amount of the dark silver paste, is used.

In particular, the process steps C and D are performed such that the electrical conductivity of the resultant dark additional electrodes is 0.05 to 0.3 times, in particular 0.1 to 0.2 times the electrical conductivity of the collection lines.

The luminance of a color is conventionally reported in the L*a*b* Color Space according to EN ISO 11664-4 (Area Colorimetry, Title Colorimetry—Part 4: CIE 1976 L*a*b* Color Space), where L* indicates the luminance of a color with values from 0 to 100.

A further aspect of the invention relates to a transparent pane, wherein the at least two collection lines have a bright, silver color with L*>65, preferably >80, and the at least one additional electrode has a dark color with L*≤65, preferably <50.

Specifically, the application of the electrically conductive coating in process step A can be done by methods known per se, preferably by magnetic field enhanced cathodic sputtering. This is particularly advantageous with regard to simple, quick, economical, and uniform coating of the first pane, when the pane according to the invention is designed as a composite pane. The electrically conductive, heatable coating can, however, also be applied, for example, by vapor deposition, chemical vapor deposition (CVD), plasma enhanced chemical vapor deposition (PECVD), or by wet chemical methods.

The first pane can be subjected to a temperature treatment after process step A. Here, the first pane with the electrically conductive coating is heated to a temperature of at least 200° C., preferably at least 300° C. The temperature treatment can serve to increase the transmittance and/or to reduce the sheet resistance of the electrically conductive coating.

The first pane can be bent after process step A, typically at a temperature of 500° C. to 700° C. Since it is technically simpler to coat a flat pane, this approach is advantageous when the first pane is to be bent. Alternatively, the first pane can, however, also be bent before process step A, for example, when the electrically conductive coating is unsuitable to withstand a bending process without damage.

The application of the collection lines in process step C and of the additional electrode in process step D is preferably done by printing and firing the silver pastes in a screenprinting method. Alternatively, the collection lines and the current supply lines can be applied as strips of an electrically conductive film on the electrically conductive coating, preferably placed, soldered, or adhesively bonded.

In a particularly preferred embodiment of the method according to the invention, the screenprinting process is performed in a manufacturing step CD. Here, the two different silver pastes are situated in the sieve. The spatial separation in the sieve is done by appropriate partitions.

In screenprinting methods, the lateral shaping is done by masking the fabric through which the printing paste with the metal particles is pressed. By suitable shaping of the masking, the width of the collection lines and of the additional electrodes can be predefined and varied particularly simply.

The coating-free zones are produced in process step B preferably by mechanical removal of the heatable coating produced in process step A. The mechanical removal can also be replaced or supplemented by treatment with suitable chemicals and/or by irradiation with electromagnetic radiation.

An advantageous improvement of the method according to the invention comprises at least the following additional steps:
  arranging a thermoplastic intermediate layer on the coated surface of the first pane and arranging a second pane on the thermoplastic intermediate layer, and
  bonding the first pane and the second pane via the thermoplastic intermediate layer.

In these process steps, the first pane is arranged such that the one of its surfaces that is provided with the heatable coating is turned toward the thermoplastic intermediate layer. The surface thus becomes the inside surface of the first pane.

The thermoplastic intermediate layer can be formed by one single thermoplastic film or also by two or more thermoplastic films that are arranged areally one over another.

The bonding of the first and second pane is preferably done under the action of heat, vacuum, and/or pressure. Methods known per se for producing a pane can also be used.

For example, so-called autoclave methods can be performed at an elevated pressure of roughly 10 bar to 15 bar and temperatures from 130° C. to 145° C. for roughly 2 hours. Vacuum bag or vacuum ring methods known per se operate, for example, at roughly 200 mbar and 80° C. to 110° C. The first pane, the thermoplastic intermediate layer, and the second pane can also be pressed in a calendar between at least one pair of rollers to form a pane. Systems of this type for producing panes are known and normally have at least one heating tunnel upstream from a pressing plant. The temperature during the pressing procedure is, for example, from 40° C. to 150° C. Combinations of calendar and autoclave methods have particularly proven their value in practice. Alternatively, vacuum laminators can be used. These consist of one or a plurality of heatable and evacuable chambers, in which the first pane and the second pane are laminated within, for example, roughly 60 minutes at reduced pressures from 0.01 mbar to 800 mbar and temperatures from 80° C. to 170° C.

The transparent pane according to the invention, in particular the transparent pane according to the invention produced using the method according to the invention can be eminently used as a functional and/or decorative individual piece and/or as a built-in component in furniture, appliances, and buildings as well as in means of transportation for travel on land, in the air, or on water, in particular in motor vehicles, for example, as a windshield, rear window, side window, and/or glass roof. Preferably, the transparent pane according to the invention is implemented as a motor vehicle windshield or motor vehicle side window pane.

It is understood that the above mentioned characteristics and those explained in detail in the following can be used not only in the combinations and configurations indicated, but also in other combinations and configurations or alone without departing from the scope of the present invention.

The invention is now explained in detail using exemplary embodiments, reference being made to the accompanying drawings. They depict, in simplified, not-to-scale representation.

In FIGS. 1 through 6, the reference characters have the following meaning:
1 windshield
2 outer pane
3 inner pane
4 adhesive layer
5 pane edge
6, 6' first side
7, 7' second side
8 electrically conductive coating
8' subregions of the electrically conductive coating 8 outside the heating field 12
9 peripheral coating-free edge strip
10 coating edge
11, 11' collection line
12 heating field
13 masking strip
13' edge of the masking strip
14 first coating-free zone
14' second coating-free zone
14" third coating-free zone
15, 15' 15" additional electrode surrounding, at least in sections, the first coating-free zone 14
16 zone edge of the first coating-free zone 14 formed by the electrically conductive coating 8

Figure 1:
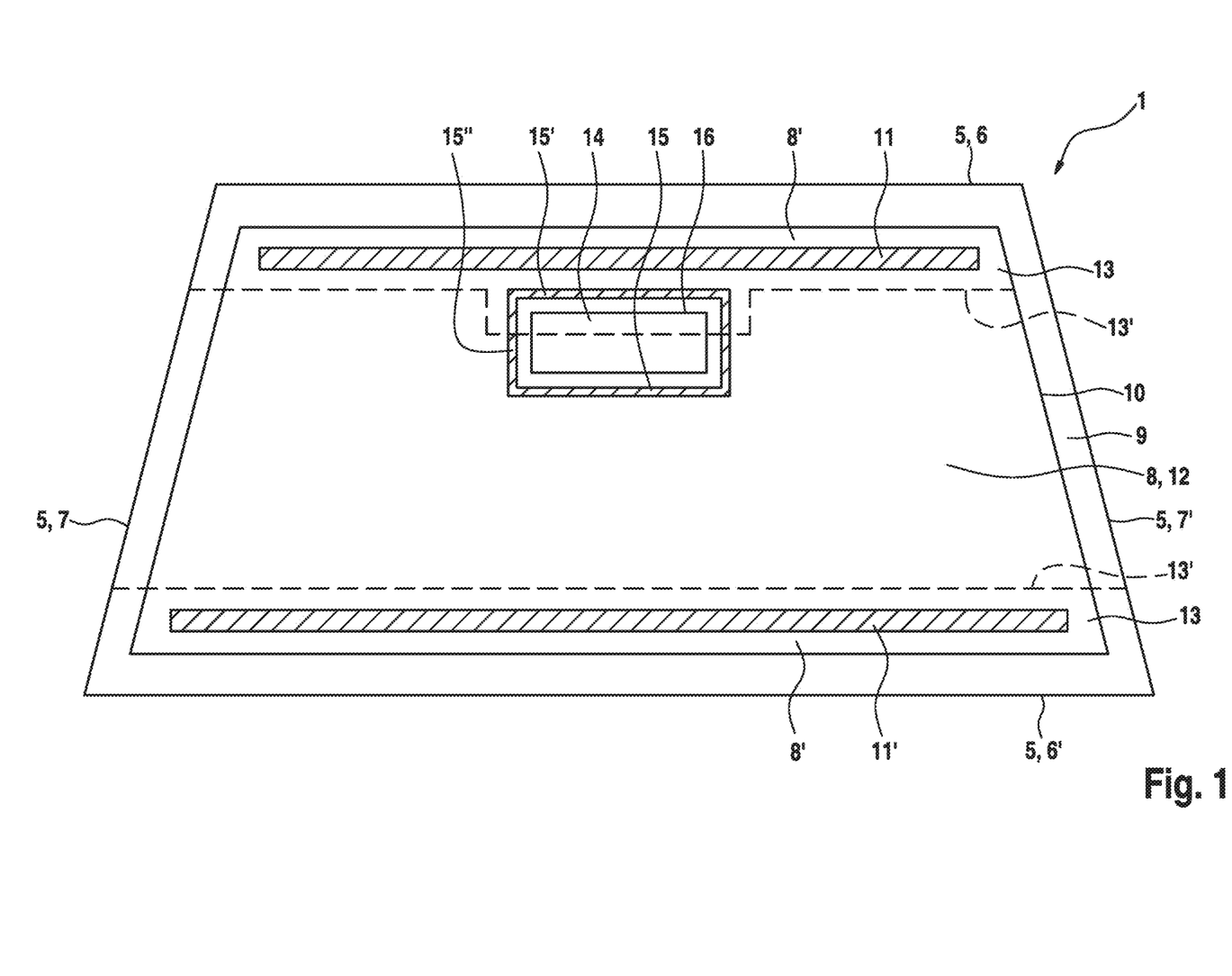
FIG. 1 a plan view of an exemplary embodiment of the windshield according to the invention.

FIG. 1 depicts a transparent windshield 1 of a motor vehicle viewed from the inside. The windshield 1 is implemented here, for example, as a composite glass pane, whose structure is illustrated using the view of a vertical section through a detail of the windshield 1 in FIG. 2 and using the perspective sectional view of the detail of the windshield 1 in FIG. 3.

Figure 2:
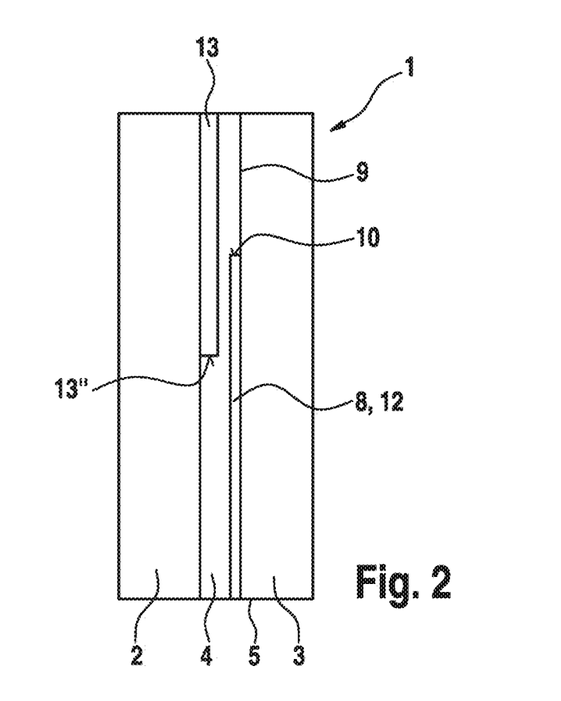
FIG. 2 a view of a vertical section through a detail of the windshield according to the invention of FIG. 1.
Figure 3:
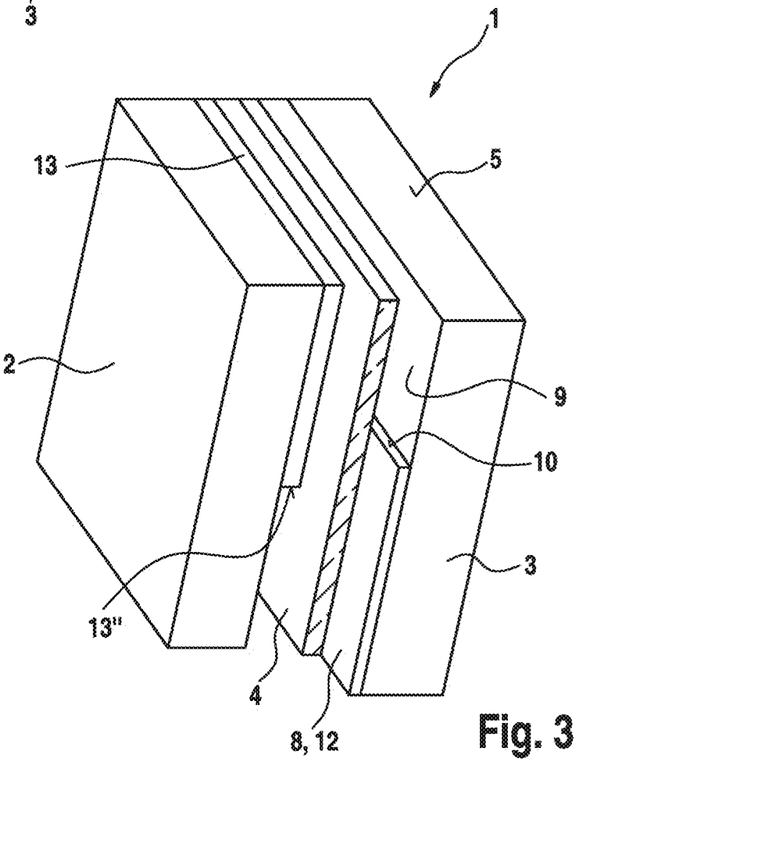
FIG. 3 a perspective sectional view of a detail of the windshield of FIG. 1.

Accordingly, the windshield 1 comprises two rigid individual panes, namely, an outer pane 2 and an inner pane 3, which are permanently bonded to one another by a thermoplastic adhesive layer 4, here, for example, a polyvinyl butyral film (PVB), an ethylene vinyl acetate film (EVA), or a polyurethane film (PU). The two individual panes 2, 3 are approx. the same size and shape and can, for example, have a trapezoidal curved contour, which is indicated in the figures. They are made, for example, of glass, also possibly made of a non-glass material such as plastic. For applications other than windshields, it would also be possible to produce the two individual panes 2, 3 from a flexible material. The contour of the windshield 1 results from a pane edge 5 common to the two individual panes 2, 3, with the windshield 1 having, at the top and the bottom, two first sides 6, 6' positioned opposite one another as well as, on the left and the right, two second sides 7, 7' positioned opposite one another.

As shown in the FIGS. 2 and 3, a transparent, electrically conductive coating 8 is deposited on the side of the inner pane 3 bonded to the adhesive layer 4. Here, the heatable, electrically conductive coating 8 is, for example, applied substantially on the full surface of the inner pane 3, with a peripheral edge strip 9 on all sides not coated such that a coating edge 10 of the electrically conductive coating 8 is set back inward relative to the pane edge 5. By this means, electrical isolation of the electrically conductive coating 8 toward the outside is realized. In addition, the electrically conductive coating 8 is protected against corrosion penetrating from the pane edge 5.

The electrically conductive coating 8 comprises, in a known manner, a layer sequence (not shown) with at least one electrically heatable, metallic sublayer, preferably silver, and, optionally, other sublayers such as antireflection and blocker layers. Advantageously, the layer sequence has high thermal stability such that it withstands the temperatures required for the bending of glass panes of typically more than 600° C. without damage, but with the possibility of also providing layer sequences that have lower thermal stability. The electrically conductive coating 8 can equally be applied as a metallic single layer. It is likewise conceivable to apply the electrically conductive coating 8 not directly on the inner pane 3, but, instead, to first apply it on a carrier, for example, a plastic film, which is subsequently adhesively bonded to the outer and inner pane 2, 3. Alternatively, the carrier film can be bonded to adhesive films (e.g., PVB films) and adhesively bonded as a three-layer arrangement (trilayer) to inner and outer pane 2, 3. The heatable, electrically conductive coating 8 is preferably applied by sputtering or by magnetron cathode sputtering on the inner or outer pane 2, 3.

As shown in FIG. 1, the electrically conductive coating 8 is electrically conductively connected adjacent the first sides 6, 6', i.e., on the upper and lower pane edge 5, to a band-shaped upper collection line or busbar 11 and to a band-shaped lower collection line 11' and, for this purpose, galvanically coupled to the two collection lines 11, 11', for example. The upper collection line 11 is provided for connecting to one pole of a voltage source (not shown). The lower collection line 11' is provided for connecting to the opposite pole of the voltage source (not shown). The two collection lines 11, 11' of opposite polarity serve for uniform introduction and distribution of the heating current in the heating field 12 of the heatable coating 8 situated therebetween. The two collection lines 11, 11' are, for example, printed on the electrically conductive coating 8 and have, in each case, an at least approx. rectilinear course.

The upper collection line 11 can be subdivided into two subregions separated from one another.

A first coating-free zone 14 with a zone edge 16 formed by the electrically conductive coating 8 is arranged below the upper collection line.

The additional electrode 15, 15', 15" completely surrounding the first coating-free zone 14 is galvanically coupled to the upper collection line 11 and the lower collection line 11' via the heating field 12 of the electrically conductive coating 8.

Here, the coating-free zone 14 has, for example, an at least approx. rectangular contour. It is permeable, at least to a portion of the electromagnetic spectrum (e.g., IR radiation, radio waves in the ultrashort, short, and longwave range), in order to enable smooth data traffic through the windshield 1. The coating-free zone 14 can, for example, be produced by prior masking during the application of the electrically conductive coating 8 on the inner pane 3. Alternatively, it can also be produced after application of the electrically conductive coating 8 by chemical and/or mechanical removal, for example, by etching or using a friction wheel.

The upper collection line 11 and the lower collection line 11' as well as the additional electrode 15, 15', 15" are produced by printing a metallic screenprinting paste, in particular a silver paste, using a screenprinting method, onto the electrically conductive coating 8, preferably in one process step.

Here, according to the invention, a bright silver paste with a silver content of 80 wt.-%, based on its total amount, is used for the production of the collection lines 11.

Here, according to the invention, a dark silver paste with a silver content of 65 wt.-%, based on its total amount, is used for the production of the additional electrode 15, 5', 15".

The resultant additional electrode 15,15',15" has 0.15 times the electrical conductivity of the collection lines 11, 11'.

The method according to the invention is performed such that the collection lines 11 and 11' are completely covered by the masking strip 13 and the first coating-free zone 14 is only partially covered.

By means of the use according to the invention of silver pastes having different silver contents, the transparent pane according to the invention of FIG. 1 meets not only the requirements of the OEMs for electrical properties, in particular the suppression of hot spots on application of a supply voltage and with relatively long operation, but also the requirements for coloration.

Figure 4:
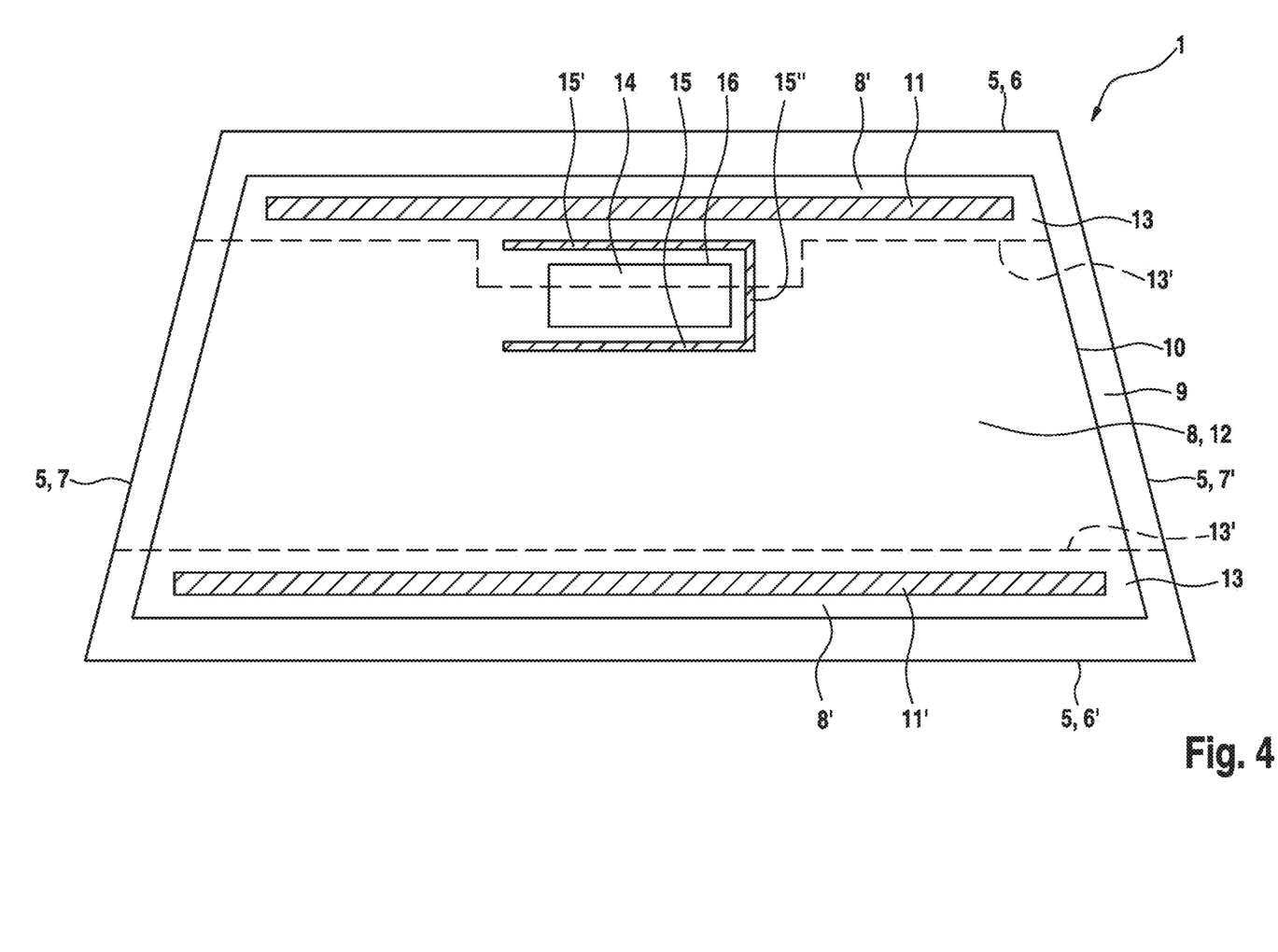
FIG. 4 a plan view of a second exemplary embodiment of the windshield according to the invention.

FIG. 4 depicts a transparent windshield 1 of a motor vehicle viewed from the inside. Here again, the windshield 1 is implemented as a composite glass pane, whose structure is illustrated with reference to the representation of a vertical section through a detail of the windshield 1 in FIG. 2 and with reference to the perspective sectional representation of the detail of the windshield 1 in FIG. 3.

The transparent windshield 1 of FIG. 4 differs from the transparent windshield 1 of FIG. 1 only through the use of an additional electrode 15,15',15", which surrounds the coating-free zone 14, in sections only, for three-fourths of the length of the zone edge 16.

By means of the use according to the invention of silver pastes having different silver contents, the transparent pane according to the invention of FIG. 4 meets not only the requirements of the OEMs for electrical properties, in particular the suppression of hot spots on application of a supply voltage and with relatively long operation, but also the requirements for coloration.

Figure 5:
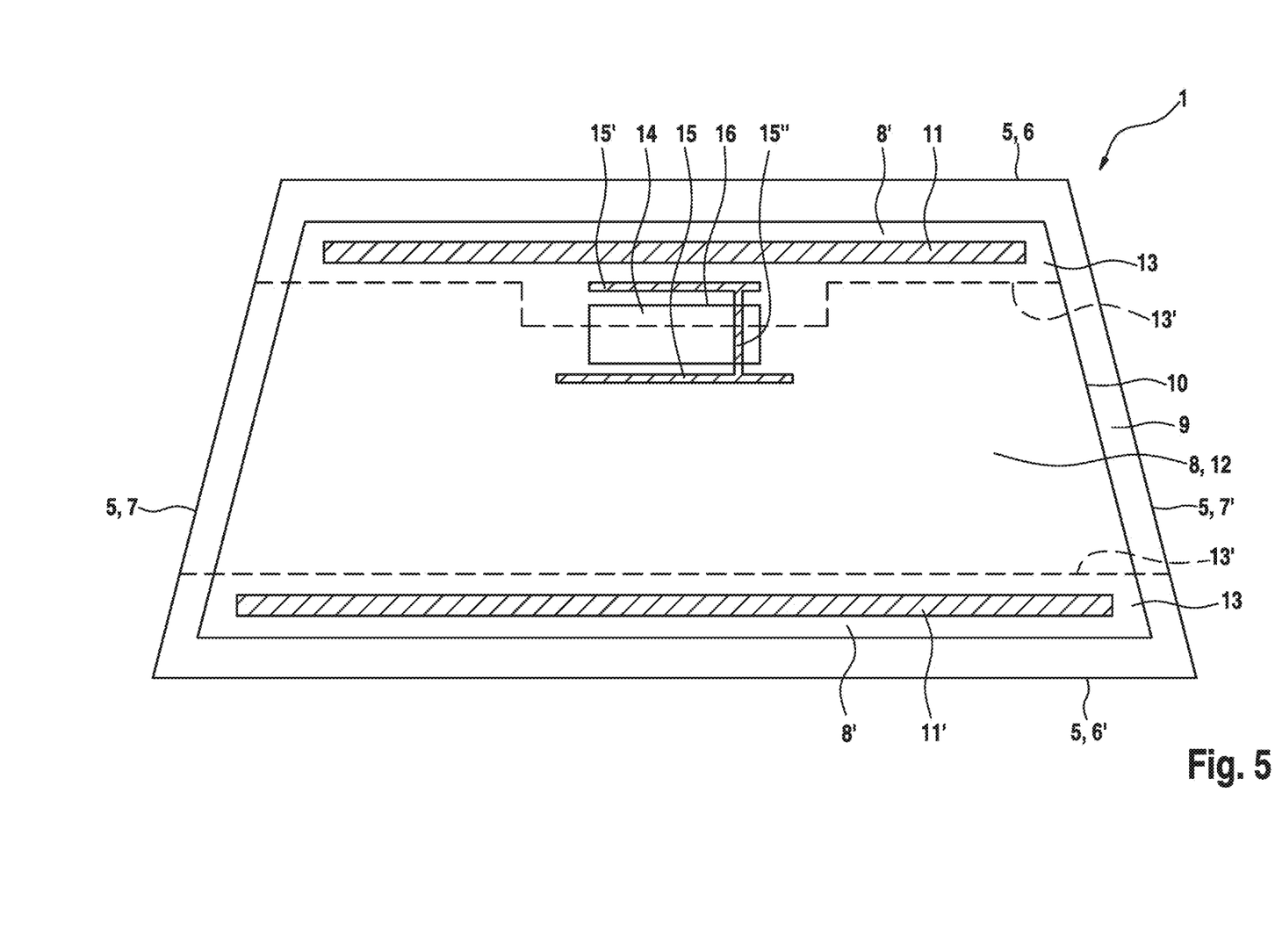
FIG. 5 a plan view of yet a third exemplary embodiment of the windshield according to the invention, and FIG. 6 a plan view of a fourth exemplary embodiment of the windshield according to the invention.

FIG. 5 depicts a transparent windshield 1 of a motor vehicle viewed from the inside. Here again, the windshield 1 is implemented as a composite glass pane, whose structure is illustrated with reference to the representation of a vertical section through a detail of the windshield 1 in FIG. 2 and with reference to the perspective sectional representation of the detail of the windshield 1 in FIG. 3.

The transparent windshield 1 of FIG. 5 differs from the transparent windshield 1 of FIG. 1 only through the use of an additional electrode 15,15',15", which surrounds the coating-free zone 14, in sections only, or roughly half the length of the zone edge 16 as subregions 15, 15' of the additional electrode. These two subregions 15,15' are connected by a subregion 15", that makes up roughly one-fourth of the length of the zone edge 16 and is routed, in sections, by the coating-free zone 14 along a section of the zone edge 16.

Through the use according to the invention of silver pastes having different silver contents, the transparent pane according to the invention of FIG. 5 meets not only the requirements of the OEMs for the electrical properties, in particular the suppression of hot spots on application of a supply voltage and with relatively long operation, but also the requirements for coloration.

Figure 6:
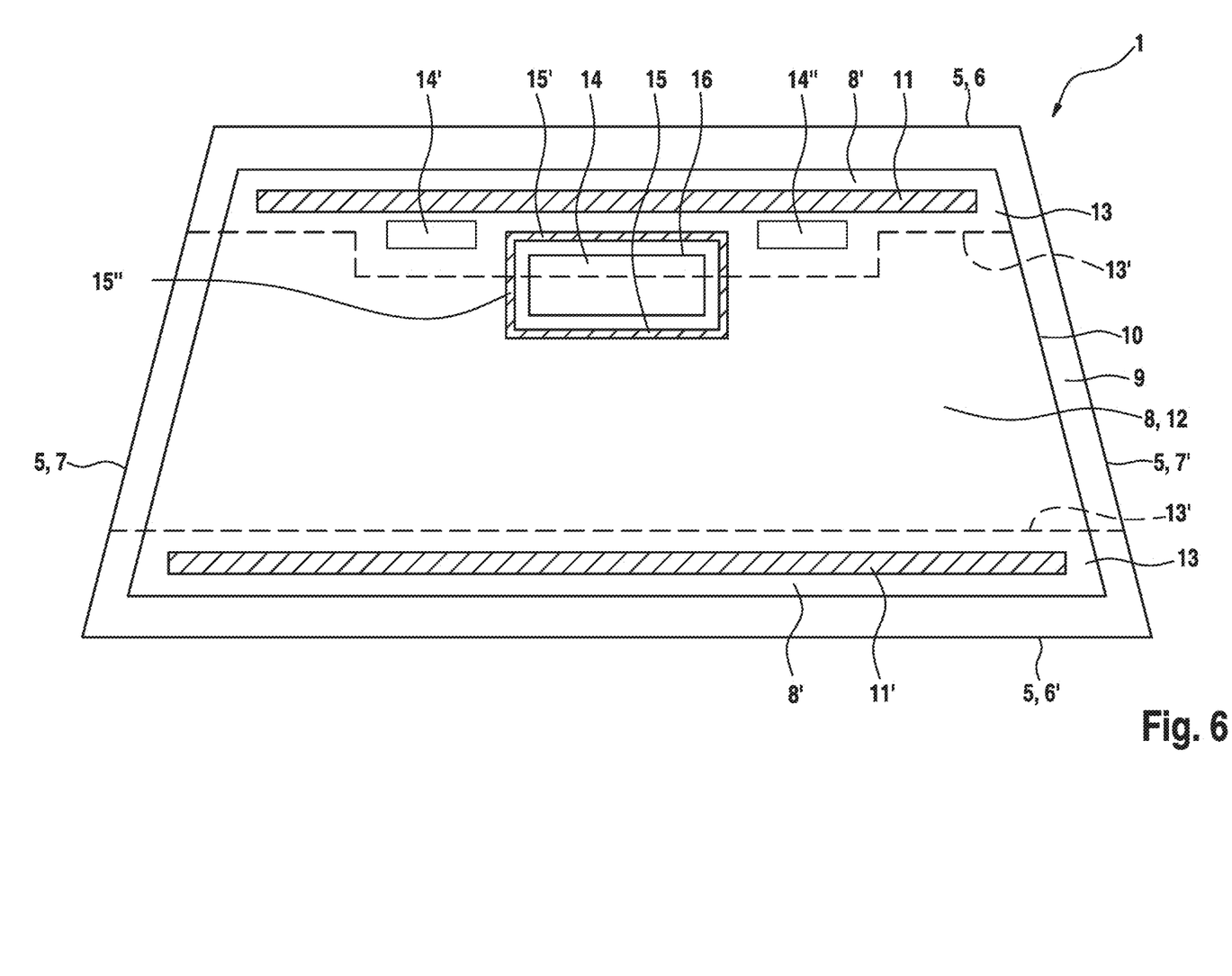

FIG. 6 depicts a transparent windshield 1 of a motor vehicle viewed from the inside. Here again, the windshield 1 is implemented as a composite glass pane, whose structure is illustrated with reference to the representation of a vertical section through a detail of the windshield 1 in FIG. 2 and with reference to the perspective sectional representation of the detail of the windshield 1 in FIG. 3.

The transparent windshield 1 of FIG. 6 differs from the transparent windshield 1 of FIG. 1 only in that in addition to the coating-free zone 14 on its left and right and below the collection line 11, another coating-free zone 14' and 14" is arranged in each case, which zones are completely covered by the masking strips 13, 13'.

Through the use according to the invention of silver pastes having different silver contents, the transparent pane according to the invention of FIG. 6 not only meets the requirements of the OEMs for the electrical properties, in particular the suppression of hot spots on application of a supply voltage and with relatively long operation, but also the requirements for coloration.

Another aspect of the invention comprises a transparent pane (1) with at least one heatable, electrically conductive coating (8), which is connected to at least two collection lines (11, 11') provided for the electrical connection to the two poles of a voltage source such that by application of a supply voltage, a heating current flows over a heating field (12) formed between the at least two collection lines, wherein the heating field (12) contains at least one coating-free zone (14), which is delimited by a zone edge (16) of the coating-free zone (14) formed, at least in sections, by the electrically conductive coating (8) and which is surrounded by at least one additional electrode (15, 15', 15"), at least in sections, wherein the at least one additional electrode (15,15', 15") is electrically connected to the collection lines (11, 11') via the heating field (12) of the coating (8), and the at least two collection lines (11, 11') have a bright, silver color and the additional electrode has a dark color.

The invention further includes a transparent pane (1), wherein the at least two collection lines (11, 11') have a higher silver content than the at least one additional electrode (15, 15', 15").

The invention further includes a transparent pane (1), wherein the electrical conductivity of the at least one additional electrode (15, 15', 15") is 0.05 to 0.3 times the electrical conductivity of the at least two collection lines (11, 11').

The invention further relates to a transparent pane (20), wherein the at least two collection lines (11, 11') have a bright, silver color with L*>65, preferably >80 and the at least one additional electrode (15, 15', 15") has a dark color with L*≤65, preferably <50.

Another aspect of the invention comprises a transparent pane (1) with at least one heatable, electrically conductive coating (8), which is connected to at least two collection lines (11, 11') provided for the electrical connection to the two poles of a voltage source such that by application of a supply voltage, a heating current flows over a heating field (12) formed between the at least two collection lines, wherein the heating field (12) contains at least one coating-free zone (14), which is delimited by a zone edge (16) of the coating-free zone (14) formed, at least in sections, by the conductive coating (8) and which is surrounded by at least one additional electrode (15, 15', 15"), at least in sections, wherein the at least one additional electrode (15,15', 15") is electrically connected to the collection lines (11, 11') via the heating field (12) of the coating (8), and the at least two collection lines (11, 11') have a bright, silver color with L*>65, preferably >80 and the at least one additional electrode (15, 15', 15") has a dark color with L*≤65, preferably <50.

The invention claimed is:

1. A transparent pane comprising:
    at least one heatable, electrically conductive coating connected to at least two collection lines configured to establish an electrical connection to two poles of a voltage source, so that an applied supply voltage of the voltage source causes a heating current to flow over a heating field formed between the at least two collection lines, wherein the heating field contains at least one coating-free zone that is delimited by a zone edge of the coating-free zone, the zone edge being formed, at least in sections, by a region of the electrically conductive coating that is surrounded, at least in sections, by at least one additional electrode,
    wherein the at least one additional electrode is electrically connected to the at least two collection lines via the heating field of the coating,
    wherein the at least two collection lines have a bright, silver color and the at least one additional electrode has a dark color, wherein production of the at least two collection lines comprises a silver paste with a silver content from 70 to 90 wt.-%, based on the total amount of the silver paste, and production of the at least one additional electrode comprises a silver paste with a silver content from 50 to <70 wt.-%, based on the total amount of the silver paste, and
    wherein an electrical conductivity of the at least one additional electrode is 0.05 to 0.3 times an electrical conductivity of the at least two collection lines.

2. The transparent pane according to claim 1, wherein the at least one additional electrode runs, at least in sections, according to one or more of: a) rectilinear, b) wave-shaped, c) meander-shaped, d) sawtooth-shaped, and e) zigzag-shaped.

3. The transparent pane according to claim 1, wherein the at least one additional electrode and the at least two collection lines are produced in one process step using two different silver pastes.

4. The transparent pane according to claim 3, wherein the at least one additional electrode and the at least two collection lines are produced by screenprinting.

5. The transparent pane according to claim 1, wherein the at least one coating-free zone is spatially associated with the upper collection line in an installed state of the transparent pane.

6. The transparent pane according to claim 1, wherein the coating-free zone is covered, in sections, by a masking strip.

7. A method for producing a transparent pane, the method comprising the following process steps:
    (A) producing an electrically conductive coating,
    (B) producing at least one coating-free zone in the electrically conductive coating,
    (C) producing at least two collection lines connected to two poles of a voltage source, the at least two collection lines being electrically connected to the electrically conductive coating so that by application of a supply voltage of the voltage source, a heating current flows over a heating field situated between the two collection lines, and
    (D) producing at least one additional electrode for electrical connection to the at least two collection lines, the at least one additional electrode surrounding, at least in sections, the at least one coating-free zone,
    wherein the process steps C and D are implemented such that an electrical conductivity of the at least one additional electrode is 0.05 to 0.3 times an electrical conductivity of the at least two collection lines.

8. The method according to claim 7, wherein the process steps (C) and (D) are performed simultaneously using screenprinting.

9. The method according to claim 7, wherein the step of producing the at least two collection lines comprises using a silver paste that delivers bright, silver colored collection lines, and wherein the step of producing the at least one additional electrode comprises using a silver paste that delivers dark additional electrodes.

10. The method according to claim 9, wherein the silver paste used for the producing of the at least two collection lines has a silver content from 70 to 90 wt.-%, based on the total amount of the silver paste, and wherein the silver paste used for the producing of the at least one additional electrode has a silver content from 50 to <70 wt.-%, based on the total amount of the silver paste.

11. A method comprising using the transparent pane according to claim 1, as a functional and/or decorative individual piece and as a built-in component in furniture, appliances, buildings, and means of transportation.

12. A method comprising using the transparent pane produced according to the method of claim 7 as a functional and/or decorative individual piece and as a built-in component in furniture, appliances, buildings, and means of transportation.

13. A transparent pane comprising:
    at least one heatable, electrically conductive coating connected to at least two collection lines configured to establish an electrical connection to two poles of a voltage source, so that an applied supply voltage of the voltage source causes a heating current to flow over a heating field formed between the at least two collection lines, wherein the heating field contains at least one coating-free zone that is delimited by a zone edge of the coating-free zone, the zone edge being formed, at least in sections, by a region of the electrically conductive coating that is surrounded, at least in sections, by at least one additional electrode, wherein the at least one additional electrode is electrically connected to the at least two collection lines via the heating field of the coating, and wherein the at least two collection lines have a bright, silver color and the at least one additional electrode has a dark color, wherein production of the at least two collection lines comprises a silver paste with a silver content from 70 to 90 wt.-%, based on the total amount of the silver paste, and production of the at least one additional electrode comprises a silver paste with a silver content from 50 to <70 wt.-%, based on the total amount of the silver paste, wherein the at least two collection lines have a bright, silver color with a luminance $L^*$ so that $L^* > 65$, or the at least one additional electrode has a dark color with a luminance $L^*$ so that $L^* \leq 65$, the luminance $L^*$ being defined according to the EN ISO 11664-4 color space.

14. The transparent pane according to claim 13, wherein the luminance $L^*$ of the at least two collection lines satisfies $L^* > 80$.

15. The transparent pane according to claim 13, wherein the luminance $L^*$ of the at least one additional electrode satisfies $L^* < 50$.

16. The transparent pane according to claim 13, wherein the at least two collection lines have a bright, silver color with a luminance $L^*$ so that $L^* > 65$, and the at least one additional electrode has a dark color with a luminance $L^*$ so that $L^* \leq 65$, the luminance $L^*$ being defined according to the EN ISO 11664-4 color space.

* * * * *